US008782124B2

(12) United States Patent
Clark et al.

(10) Patent No.: US 8,782,124 B2
(45) Date of Patent: Jul. 15, 2014

(54) ENHANCING BROWSER HISTORY USING SYNDICATED DATA FEEDS

(75) Inventors: Bryan W. Clark, Westford, MA (US); Colin Walters, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 1287 days.

(21) Appl. No.: 12/039,562

(22) Filed: Feb. 28, 2008

(65) Prior Publication Data

US 2009/0222735 A1    Sep. 3, 2009

(51) Int. Cl.
*G06F 15/16* (2006.01)
*G06F 3/00* (2006.01)

(52) U.S. Cl.
USPC .......................................... 709/203; 715/738

(58) Field of Classification Search
USPC .......................................................... 709/203
See application file for complete search history.

(56) References Cited

U.S. PATENT DOCUMENTS

| | | | | |
|---|---|---|---|---|
| 6,981,040 | B1 * | 12/2005 | Konig et al. | 709/224 |
| 7,424,476 | B2 * | 9/2008 | Apparao et al. | 707/10 |
| 2004/0001104 | A1 * | 1/2004 | Sommerer et al. | 345/811 |
| 2004/0003351 | A1 * | 1/2004 | Sommerer et al. | 715/517 |
| 2004/0205514 | A1 * | 10/2004 | Sommerer et al. | 715/501.1 |
| 2006/0129917 | A1 * | 6/2006 | Volk et al. | 715/513 |
| 2006/0168510 | A1 * | 7/2006 | Bryar et al. | 715/511 |
| 2007/0016543 | A1 * | 1/2007 | Epling et al. | 707/1 |
| 2007/0033517 | A1 * | 2/2007 | O'Shaughnessy et al. | 715/501.1 |
| 2007/0180381 | A1 * | 8/2007 | Rice et al. | 715/711 |
| 2008/0010294 | A1 * | 1/2008 | Norton et al. | 707/10 |
| 2008/0140674 | A1 * | 6/2008 | Ishikawa | 707/10 |
| 2009/0024946 | A1 * | 1/2009 | Gotz | 715/769 |

OTHER PUBLICATIONS

NewsFeedMain, Martin C. Doege, Jan. 4, 2007, [online], retrieved from the internet <web.archive.org/web/*/http://home.arcor.de/mdoege/newsfeed/>, pp. 1-5 as printed.*
NewsFeedDocumentation, Martin C. Doege, Mar. 8, 2007, [online], retrieved from the internet <web.archive.org/web/*//home.arcor.de/mdoege/newsfeed/README.html>, pp. 1-7 as printed.*
NewsFeedHistory, Martin C. Doege, Mar. 9, 2007, [online], retrieved from the internet <web.archive.org/web/*/home.arcor.de/mdoege/newsfeed/history.html>, pp. 1-6 as printed.*

* cited by examiner

*Primary Examiner* — Michael Chao
*Assistant Examiner* — Shu Chun Gao
(74) *Attorney, Agent, or Firm* — Lowenstein Sandler LLP

(57) ABSTRACT

Embodiments relate to systems and methods for enhancing browsing history using syndicated data feeds. A browser contains a navigation manager that captures and tracks the URLs (universal resource locators) of the Web sites and subsections of sites that a user visits. The captured URL pathways are stored to a navigation record. In addition, the presence and identify of RSS feeds which the user has chosen to activate is also recorded. Upon return to the same Web site or other location, the navigation manager directs the user to the specific section of the Web site associated with the RSS feed, such as media lists, photography upload sections, or other portions of a Web site.

21 Claims, 4 Drawing Sheets

ENHANCING BROWSER HISTORY USING SYNDICATED DATA FEEDS

FIELD

The present invention relates to techniques for capturing enriched browser history information, and more particularly to systems and methods for incorporating RSS (Really Simple Syndication) feeds in browser history records.

BACKGROUND OF RELATED ART

Most conventional browsers track and record browsing history of a user as they navigate to different sites on the Internet or other network. Typically a browser records the universal resource locator (URL) addresses of different sites as the user enters or selects different sites to navigate to, such as news sites, social networking sites, email portals, or other sites. Many browsers then permit a user to view their recent browser history to reload or return to one of the sites they have recently visited.

The browsing history that is captured by the browser and available to the user is not, however, always fully useful or informative to the user. One difficulty in reconstructing navigation history is that many Web sites contain a complex hierarchy of subsections, each with various distinct or extended URLs. For instance, a user arriving at the Web site of a large media vendor may be presented with choices to navigate into one section for movie downloads, one section for music downloads, and another section for ordering books. The browsing history function of available browsers will capture the top-level URL of the visited sites, but may or may not record the navigation history through the various subsections of a site. Thus a user may only be directed back to the home page associated with the top-level URL of a site, as opposed to the subsection of interest, such as books in the example noted.

Upon selecting the site from the browser history the user may therefore be forced to re-navigate to the section of interest. It may furthermore be difficult for the browser logic to discriminate sections of interest at a site, given fairly length or complex URLs associated with different sections of a site that have no clear relation to other URLs for other sections of the site. It may be desirable to provide methods and systems to better capture, clarify, and update a user's browsing history.

DESCRIPTION OF THE DRAWINGS

The accompanying drawings, which are incorporated in and constitute a part of this specification, illustrate embodiments of the present teachings and together with the description, serve to explain principles of the invention. In the figures.

DESCRIPTION OF EMBODIMENTS

Embodiments of the present invention relate to systems and methods for enhancing browser history using syndicated data feeds. More particularly, a browser installed on a client can incorporate a navigation manager that monitors and records the navigation or browsing history of a user as they access Internet or other network sites. The navigation manager captures the URLs of the visited sites and their subsections to a stored navigation record, to create a contextual record of the user's visit to a site. In addition, the navigation manager captures RSS (Really Simple Syndication) feeds that are associated with sites that a user visits. For example, when a user selects an RSS feed to receive syndicated updates from a section of a site, such as newly available movies from a media vendor site, the navigation manager identifies that feed and stores the associated feed attributes to the navigation record. In general, as appreciated by persons skilled in the art, RSS feeds themselves represent an XML-based service for content distribution via automated feeds, which can be selected or subscribed to via links on a Web page.

According to various embodiments, the navigation manager can preferentially return the user to the section of the site with which the RSS feed is associated, since the user has demonstrated interest in subscribing to services rendered at that portion of the site. The navigation manager can further filter the captured URL information based on identified sections or services or interest. For example, purely intermediary or temporary URLs which transport the user from one section of a site to another can be discarded. Other optimizations or enhancements of the navigation history can be performed. These and other embodiments described herein address the various noted shortcomings in known browser technology, and provide an enhanced and more informative navigation history.

Reference will now be made in detail to exemplary embodiments of the invention, which are illustrated in the accompanying drawings. Where possible the same reference numbers will be used throughout the drawings to refer to the same or like parts.

Figure 1:
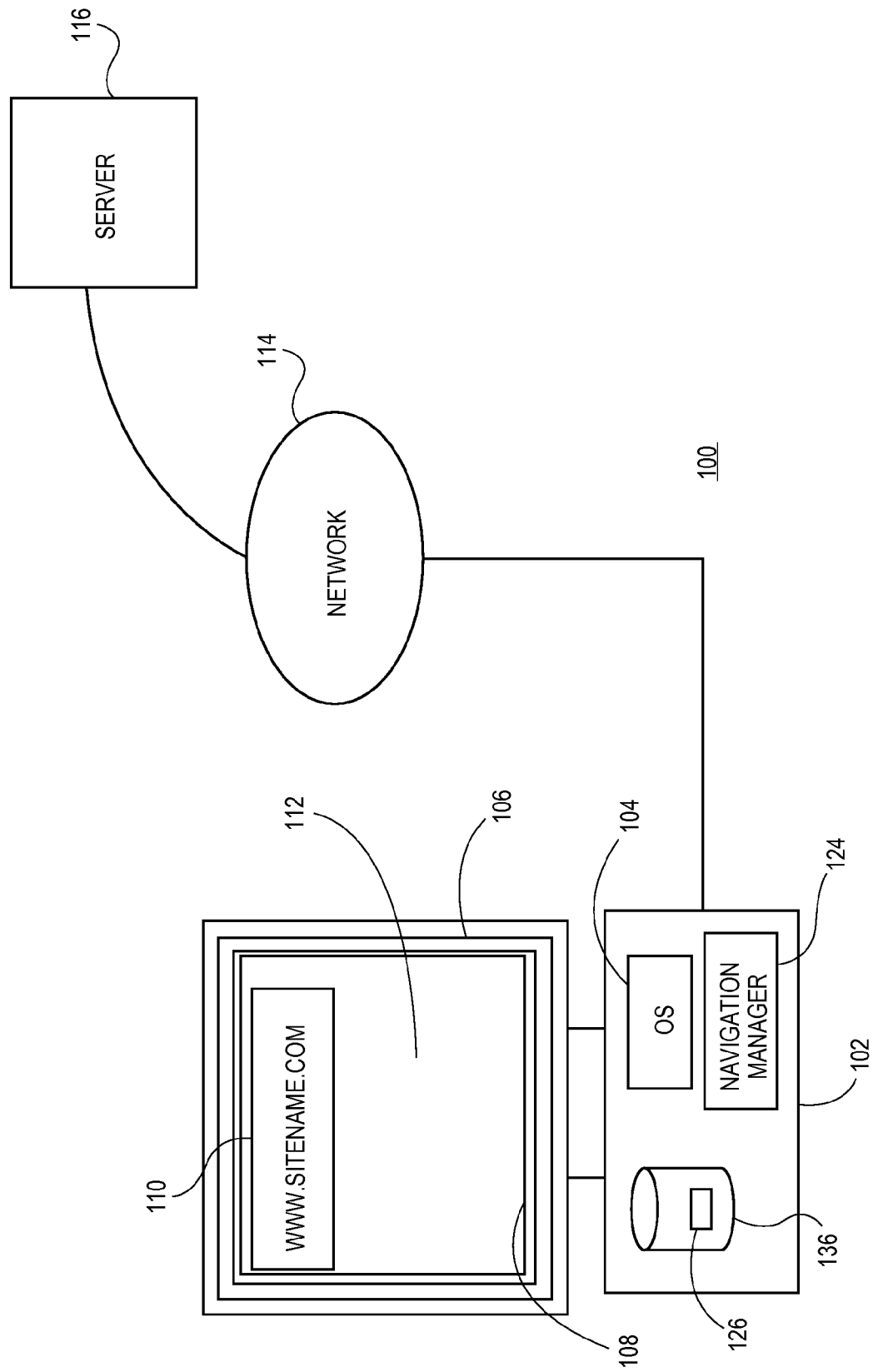
FIG. 1 illustrates a client and various resources with which systems and methods for enhancing browser history using syndicated data feeds can operate, according to various embodiments.

FIG. 1 illustrates an overall system 100, consistent with embodiments of the present teachings. In embodiments as shown, a user can operate a browser 108 on a client 102 to navigate or browse to a site 112 via a network 114. Browser 108 can be a Web browser, such as the Firefox™, Opera™, or other open-source or proprietary browser application. Site 112 can be identified by a uniform resource locator (URL) 110, which can be in a http://www.sitename.com format under the hyper text transfer protocol. In embodiments, other types or formats of site addressing or identification can be used. Network 114 can be or include the Internet, or other public or private networks. Site 112 can be hosted by a site server 116, such as a Web server.

Client 102 can host and run under control of an operating system 104, such as a distribution of the Linux™ operating system, the Unix™ operating system, or other open-source or proprietary operating system. Client 102 can present a user interface 106, such as a graphical user interface, to the user via operating system 104. Client 102 can contain or access resources including a data store 136, such as a local database stored on a hard drive.

In general, the user operates browser 108 to browse or navigate to one or more site 112. The user can manually type in or enter a URL 110 for each site the user wishes to view or visit, or can select links on a given site 112 that embeds a further URL 110 in hyper text markup language (HTML), or can otherwise navigate from one site to another. In some embodiments the user can also open or browse multiple sites at one time through multiple running instances of browser 108. As the user navigates or browses from one site 112 or other location to the next, the URL 110 can automatically be entered or updated to reflect a next section of a site, or new top-level site.

Client 102 further incorporates or hosts a navigation manager 124 to capture, record and manage a navigation record 126 reflecting the navigation or browsing history of the user as they move from site to site. Navigation manager 124 can be integrated in browser 108, as part of the logic of that software or application. In embodiments, navigation manager 124 can be embedded in other software or resources, for instance in operating system 104 or elsewhere. Navigation record 126 can, for example, detect and store records of a series of the URLs 110 that a user has visited, as well as attributes or metadata related to the set of sites 112 that the user has browsed. Those attributes or metadata can include for instance the Internet protocol (IP) addresses of the site server 116, date and time information for the visit, cookies or digital certificates produced or exchanged with each site 112, links or downloads selected by the user while at site 112, and other information. Navigation record 126 can further include information related to syndicated data feeds activated by a user upon visiting site 112.

Figure 2:
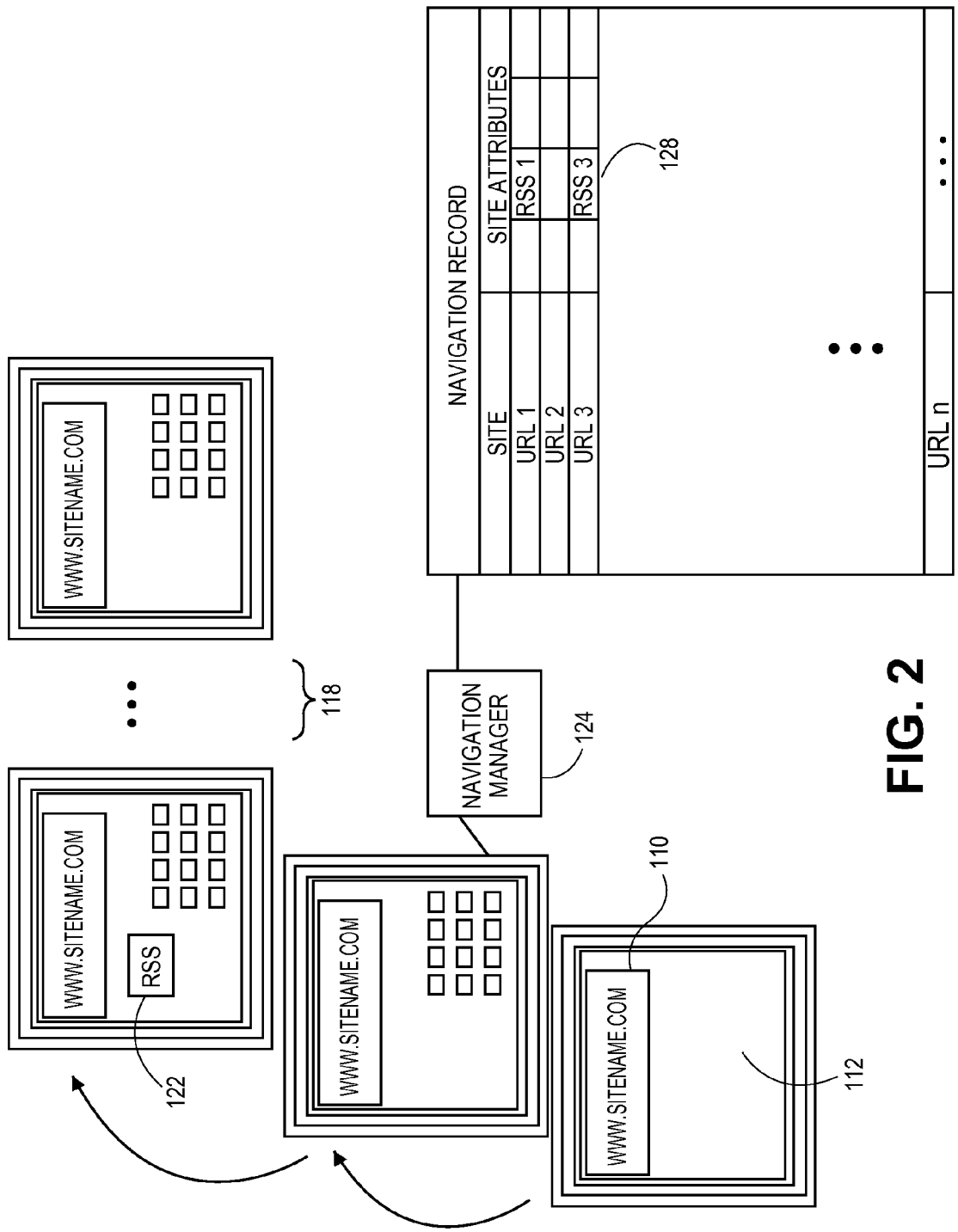
FIG. 2 illustrates an overall network configuration in which systems and methods for enhancing browser history using syndicated data feeds can operate, according to various embodiments.

More particularly, as shown in FIG. 2, as a user navigates to a site 122, navigation manager 124 captures a series of URLs 110 as the user browses from one section of site 112 to another. For instance, a site 112 that comprises a media store can contain a set of linkable sections 118 or pages for different types of media or other content, each section being located by a different extended URL 110. One section might comprise a set of downloadable video files or clips, and have an associated URL 110 of http://www.mediastore.com/video. Another section might comprise a set of downloadable music or audio files, and have an associated URL 110 of http://www.mediastore.com/music. A third section might comprise a set of selectable books for electronic download or for physical order and delivery, and have an associated URL 110 of http://www.mediastore.com/books. Other formats and extensions of URL 110 are possible.

Within site 112 the user can navigate, for instance, to a section in linkable sections 118 that presents a set of selectable media 120, the user may view and/or select one or more media downloads, purchases, or other selections within that section of site 112. The user can also select and activate an RSS feed 122 to, for instance, automatically receive updates selections of selectable media 120 for later viewing. According to embodiments of the present teachings, the selection of RSS feed 122 is detected and captured by navigation manager 124. Navigation manager 124 records the identity of RSS feed 122 and related information, including for instance the IP address of the source of the syndicated data feed delivered via the feed, and stores that information to navigation record 126 in RSS hook 128. Navigation manager 124 for example can capture the URL 110 of the section in the set of linkable sections 118 in which the RSS feed 122 is located, and stores that addressing or identification information to RSS hook 128. Navigation manager 124 then manages, enhances, or extends navigation record 126 to take the user's behavior as reflected in the selected RSS feed 122 into account, and to enhance downstream navigation performed by the user.

Navigation manager 124 can, for example, record a point of re-entry 138 to site 112 that begins at the specific section of the set of linkable sections 118 where the user activated RSS feed 122. The user can then be directed to that section upon later return to site 112, as opposed for example to being directed to the top-level URL 110 for site 112 as a whole. The user's navigation history can thereby be clarified and directing the user to unnecessary browsing points can be avoided, permitting more convenience in site navigation. Navigation manager 124 can likewise perform other logic on or based on navigation record 126 to reflect the presence and identity of RSS feed 122. Navigation manager 124 can, for example, record other sections in the set of linkable sections 118 that are linked to the point of re-entry 138 to present to the user to select or navigate to, even if the user has not yet navigated to those sections. Navigation manager 124 can, in further regards, capture textual or character information delivered by RSS feed 122 to extract potential search terms of interest, to store for potential suggestion or use at search sites.

Other enhancements to navigation record 126 and the user's browser experience based on the presence and identity of RSS feed 122 are possible. According to embodiments, the navigation manager 124 for further example can monitor RSS feed 124 to transparently update navigation record 126 at later times, even if the user has not yet returned to site 112. For example, if the section in set of linkable sections 118 that contains music media of interest to the user as reflected in an RSS feed 122 stored in RSS hook 128 has changed, navigation manager 124 can update RSS hook 128 and point of re-entry 138 to reflect the new URL 110 of the designated section. Other updates are possible. It will be appreciated that in embodiments, navigation manager 124 can monitor other types of syndicated or automatic data feeds together with or instead of RSS feed 122, including, for instance, Atom™ feeds or others.

Figure 3:
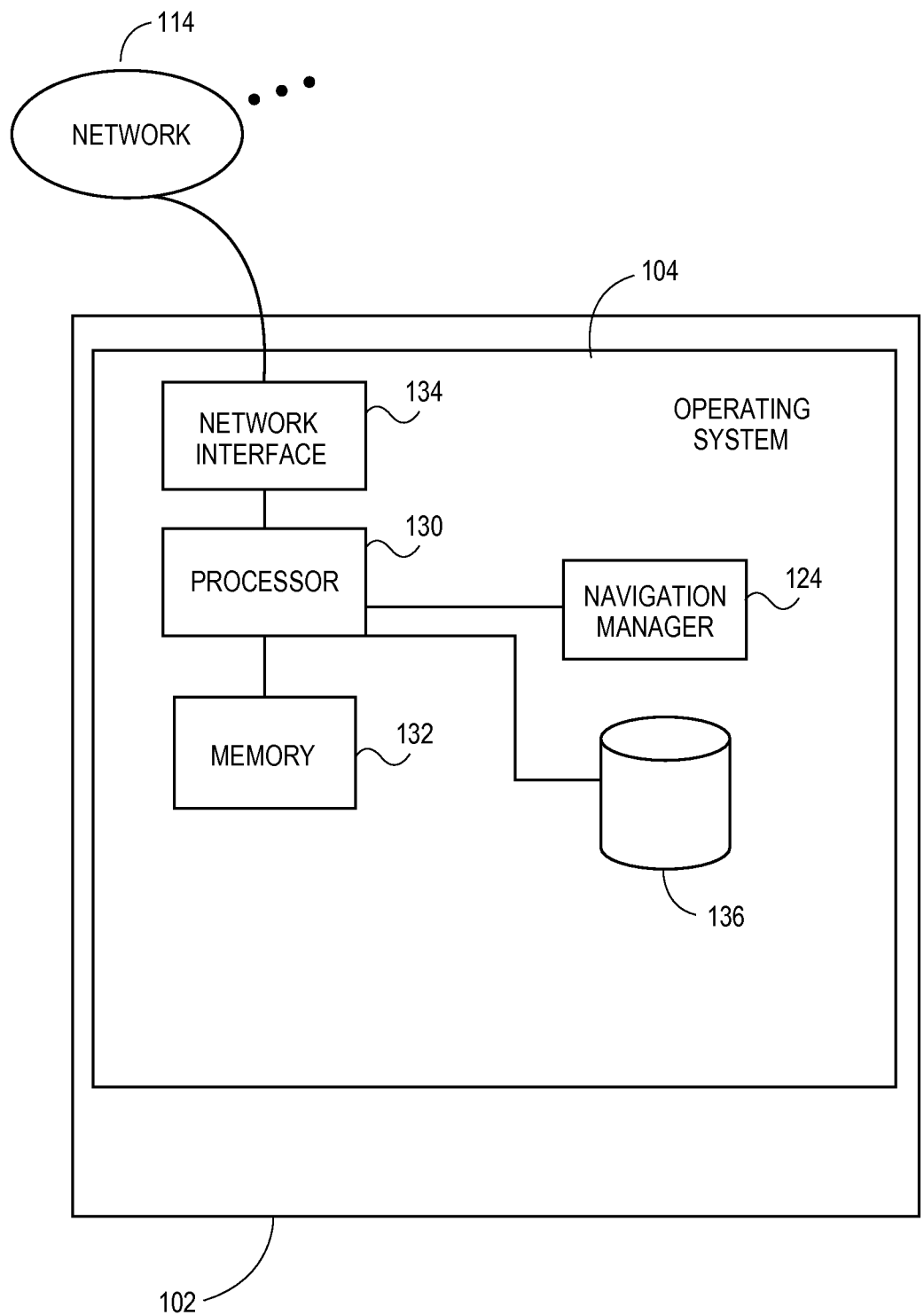
FIG. 3 illustrates an exemplary hardware configuration that can be used in conjunction with systems and methods for enhancing browser history using syndicated data feeds, according to various embodiments.

FIG. 3 illustrates an illustrative hardware configuration of a navigation manager 124, according to embodiments. In embodiments as shown, client 102 can comprise a processor 130 communicating with memory 132, such as electronic random access memory, operating under control of or in conjunction with operating system 104. Processor 130 also communicates with data store 136, which in turn hosts navigation record 126. Processor 130 further communicates with navigation manager 124, and with network interface 134. Network interface 134 communicates with network 114 to provide access to one or more site 112, such as Internet or Web sites. Network interface 134 can be or include an Ethernet connection, a wireless data link, or other wired, wireless, or optical channel, link, or connection. Other configurations are possible.

Figure 4:
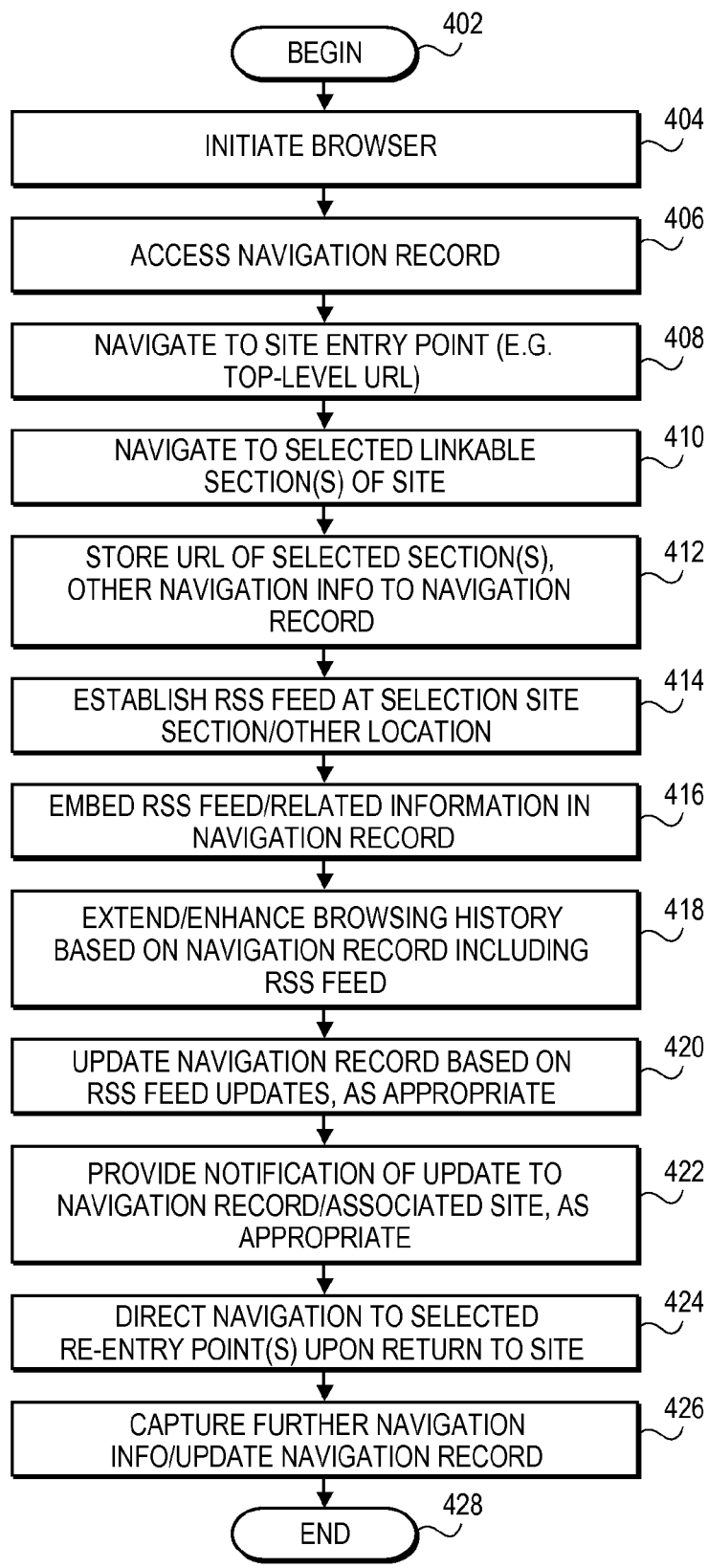
FIG. 4 illustrates a flowchart of overall browser history processing, according to various embodiments.

FIG. 4 illustrates overall navigation tracking and browser history processing, according to various embodiments of the present teachings. In step 402, processing can begin. In step 404, browser 108 can be initiated on client 102. In step 406, navigation record 126 can be accessed by navigation manager 124 of browser 108 to process a newly-visited site and/or to review the prior history of navigation.

In step 408, the user can navigate to an entry point of a site 112, for instance, by typing in a URL 110, by selecting a link from another site, or by selecting a previously-visited site in navigation record 126. In step 410, the user can navigate to a selected linkable section in the set of linkable sections 118 of site 112. In step 412, the navigation information including URL 110 for each intervening page or section of site 112 that is associated with the selected section of site 112 is stored to navigation record 126. In step 414, an RSS feed 122 can be established for selected content to be delivered and updated from site 112, such as news, media, personal networking data, or other content, service, or information. In embodiments, RSS feed 122 can be established by the user making a highlighted selection of content or sources to be subscribed to, and thereby automatically updated and downloaded. In embodiments, syndicated data updates can be delivered with other channels or protocols, such as an Atom™ feed.

In step 416, navigation manager 124 can store the identity of RSS feed 122 along with associated information to navigation record 126. In step 418, navigation manager 124 can access and operate on navigation record 126 to clarify and/or enhance navigation record based on the identity and/or attributes of RSS feed 122. Thus for example the user's default re-entry point for Web site of a media vendor hosting movie material, song material, orderable books, and other types or categories can be assigned to the book section, with associated URL 110, upon registration of an RSS feed 122 subscribing to updates to available book titles within media store 120. Navigation manager 124 can perform other clarifications or optimizations to navigation record 126 based on the presence, identity, and/or attributes of RSS feed 122. For example, navigation manager 124 can store URLs or links to sites or content that is related to the stored RSS feed 122, for convenient access to related material. In embodiments, the navigation record 126 can be cleaned up or modified to delete intermediate or temporary URLs within site 112.

In step 420, navigation manager 124 can update navigation record 126 based on updates delivered via RSS feed 122. For example, the addition of new song titles in a set of selectable media 120 can cause navigation manager 124 to cause the point of re-entry to be set to the URL 110 of the latest set of songs. In step 422, notification of an update to navigation record 126 can be provided to the user as appropriate, for instance via a pop-up in browser 108. In step 424, a user returning to a site 112 recorded in navigation record 126 can be directed or guided to re-entry points based on one or more active RSS feed 122 recorded for that site 112. In step 426, the further navigation history of a user returning to site 112 can be captured to navigation record 126. In step 428, processing can repeat, return to a prior processing point, jump to a further processing point, or end.

The foregoing description is illustrative, and variations in configuration and implementation may occur to persons skilled in the art. For example, while embodiments have been described with respect to RSS feeds, in embodiments other types of data syndication, channels, or connections can be tracked to enhance browsing history. For example, an Atom™ feed can be used. For further example, while embodiments have been described in which the site being accessed is an Internet site or Web site, in embodiments, navigation to other public or private networks or sites can be tracked. For again further example, while embodiments have been described in which the location of a site is defined by a URL, in embodiments, other addresses, locators, or identifiers can be used to identify and/or navigate to sites. For yet further example, while embodiments have been described in which the navigation history is registered and stored on the client machine itself, in embodiments the navigation history and related information can be stored to other locations, such as a remote server. Other resources described as singular or integrated can in embodiments be plural or distributed, and resources described as multiple or distributed can in embodiments be combined. The scope of the invention is accordingly intended to be limited only by the following claims.

What is claimed is:

1. A method comprising:
   detecting, by a web page browser executed by a processor and operating on a client system, a selection by a user to subscribe to a data syndication feed associated with a first network location;
   storing, in a browser history of the web page browser, the first network location associated with the data syndication feed;
   updating, by the web page browser, the first network location in the browser history to a second network location in response to an update associated with the data syndication feed;
   receiving, by the web page browser, a selection of the browser history from the user to navigate to the first network location; and
   directing, by the web page browser and in response to receiving the request, the user to the second network location that the user had not yet navigated to and that is related to the data syndication feed.

2. The method of claim 1, wherein the first network location comprises a website.

3. The method of claim 2, wherein the website is specified by a uniform resource locator (URL).

4. The method of claim 3, wherein the website comprises a set of sections, each section comprising a distinct uniform resource locator (URL).

5. The method of claim 4, wherein the browser history comprises a uniform resource locator (URL) designating a re-entry point for accessing a section of a website associated with the data syndication feed.

6. The method of claim 1, wherein updating the browser history comprises discarding an intermediate network location from the browser history.

7. The method of claim 1, wherein the browser history of the web page browser is stored on the client system.

8. The method of claim 1, wherein the data syndication feed comprises one of an RSS feed and an Atom feed.

9. A system comprising:
   a network interface to access a set of network locations; and
   a web page browser executed by a processor and operating on a client system and to communicate with the network interface, the web page browser comprising a navigation manager module configured to:
   detect a selection by a user to subscribe to a data syndication feed associated with a first network location;
   store, in a browser history of the web page browser, the first network location associated with the data syndication feed;
   update the first network location in the browser history to a second network location in response to an update associated with the data syndication feed;
   receive a request selection of the browser history from the user to navigate to the first network location; and
   direct, in response to receiving the request, the user to the second network location that the user has not yet navigated to and that is related to the data syndication feed.

10. The system of claim 9, wherein the first network location comprises a website.

11. The system of claim 10, wherein the website is specified by a uniform resource locator (URL).

12. The system of claim 11, wherein the website comprises a set of sections, each section comprising a distinct uniform resource locator (URL).

13. The system of claim 12, wherein the browser history comprises a uniform resource locator (URL) designating a re-entry point for accessing a section of a website associated with the data syndication feed.

14. The system of claim 9, wherein the navigation manager module is further configured to discard an intermediate network location from the browser history.

15. The system of claim 9, wherein the browser history is stored on the client system.

16. The system of claim 9, wherein the data syndication feed comprises one of an RSS feed and an Atom feed.

17. A non-transitory computer-readable medium comprising instructions to cause a processor to perform operations comprising:
    detecting, by a web page browser operating on a client system, a selection by a user to subscribe to a data syndication feed associated with a first network location;
    storing, in a browser history of the web page browser, the first network location associated with the data syndication feed;
    updating, by the web page browser, the first network location in the browser history to a second network location in response to an update associated with the data syndication feed;
    receiving, by the web page browser, a request selection of the browser history from the user to navigate to the first network location; and
    directing, by the web page browser and in response to receiving the request, the user to the second network location that the user has not yet navigated to and that is related to the data syndication feed.

18. The non-transitory computer-readable medium of claim 17, wherein the first network location comprises a website.

19. The non-transitory computer-readable medium of claim 18, wherein the website is specified by a uniform resource locator (URL).

20. The non-transitory computer-readable medium of claim 19, wherein the website comprises a set of sections, each section comprising a distinct uniform resource locator (URL).

21. The non-transitory computer-readable of claim 20, wherein the browser history comprises a uniform resource locator (URL) designating a re-entry point for accessing a section of a website associated with the data syndication feed.

* * * * *